United States Patent [19]
de Beus

[11] Patent Number: 5,320,524
[45] Date of Patent: Jun. 14, 1994

[54] GAS SCRUBBER FOR WET PROCESS ROTARY KILNS

[76] Inventor: Anthony J. de Beus, 220 Avenue H, Apt. 1, Redondo Beach, Calif. 90277

[21] Appl. No.: 107,112

[22] Filed: Aug. 16, 1993

[51] Int. Cl.$^5$ ............................................... F27B 7/00
[52] U.S. Cl. ..................................... 432/103; 432/110; 432/111; 432/118
[58] Field of Search ................. 432/103, 118, 110, 111

[56] References Cited

U.S. PATENT DOCUMENTS

| | | | |
|---|---|---|---|
| 3,802,831 | 4/1974 | Woodward | 432/118 |
| 4,676,740 | 6/1987 | de Beus | 432/103 |
| 4,726,765 | 2/1988 | O'Connor | 432/118 |
| 4,784,604 | 11/1988 | O'Connor | 432/118 |
| 4,988,290 | 1/1991 | Forster et al. | 432/103 |
| 4,993,942 | 2/1991 | Boyden, II et al. | 432/14 |

Primary Examiner—Henry C. Yuen
Attorney, Agent, or Firm—James D. Thackrey

[57] ABSTRACT

In the initial part of a wet-process rotary kiln, means to decrease the amount of product dust entrained in the escaping combustion gases. Pipes running lengthwise of the kiln, in the region where the feed slurry is wet enough to flow, fill with slurry as they rotate through the slurry pool at the bottom of the kiln, and discharge their contents through exit ports so placed on each pipe as to emit streams of slurry when the pipe is carried by kiln rotation to a position near the top of the kiln. In conjunction with the forest of chains commonly used in such kilns, the transverse-flowing combustion gases are scrubbed of some of their entrained product dust content by its being entrapped in wet slurry and recycled.

2 Claims, 1 Drawing Sheet

GAS SCRUBBER FOR WET PROCESS ROTARY KILNS

BACKGROUND OF THE INVENTION

1. Field of the Invention

Kilns in which chemical transformation of bulk materials occur continuously as combustion gases flow along the kiln axis, counter to a flow of input feed, frequently operate with the feed stock suspended in a water slurry. In such kilns, particularly cement kilns, the escaping combustion gases entrain a sizeable percentage of finely divided product. The field of this invention is that of reducing the Mount of product which leaves the kiln entrained in the stream of exhaust gas.

2. Description of Prior Art

A typical wet-process rotary kiln constructed according to the present state of the art is a long cylindrical shell rotated about its axis and tilted about two degrees from horizontal so the material fed into it tends to flow downward and the counterflowing gases from a system of burners exit at the upper end. The liquid slurry enters the kiln at the higher end and loses its moisture in a relatively short distance as it progresses toward the burner-and-product-discharge end.

Product is basically in the form of clinkers or chunks of reacted feed stock, but the tumbling of these clinkers during their progress along the bulk of the kiln length ensures a copious supply of product dust at the lower, exit end of the kiln. Standard practice is to fasten loops of chain to the interior kiln wall, near the slurry entrance. The resulting forest of chains, in which some are for the moment at the top of the rotating kiln, others drooping with the lower part of the loop in slurry flowing along the bottom, and still others fully immersed in the slurry, serves two purposes. Heat passes from the flowing combustion gases into the metal of the chains and from there (when that chain is at or near the bottom of the kiln) into the slurry, saving energy. Further, the ascending chains are wet, so the aforementioned dust (product) collects on them, is largely returned to the slurry as the kiln rotates, and is recycled through the kiln, undergoing the thermal process again.

The physical arrangement described above comprises the prior art. Approximately 11 percent of the product still leaves the kiln entrained in exhaust combustion gases and must be recovered by electrostatic precipitators or equivalent means.

SUMMARY OF THE INVENTION

My invention is to provide means, using the rotation of the kiln, to increase greatly the exposure of the product dust to slurry during the relatively short length during which the product dust is passing through the forest of chains.

Under my invention the portion of kiln length normally assigned to the forest of chains is provided with means to lift slurry from its usual position-running along whatever part of the inner kiln surface is at the bottom-and dump it in the two quadrants which are temporarily at the top of the kiln. This is accomplished by attaching the chain supporting half links to the web of special structural channels and welding the flanges of the structural channels to the kiln inner wall, leaving gaps between adjacent channels into which pipes are fitted. The pipes fill with slurry as they pass through the pool of slurry, then are lifted by rotation of the kiln until discharge ports along their length become positioned lower than the slurry surface within that particular pipe, at which time the pipe is above the kiln axis. The result is number of streams of slurry falling amidst the forest of chains, keeping the chains wet and also capturing entrained product dust as it passes by.

DETAILED DESCRIPTION OF PREFERRED EMBODIMENT

Figure 1:
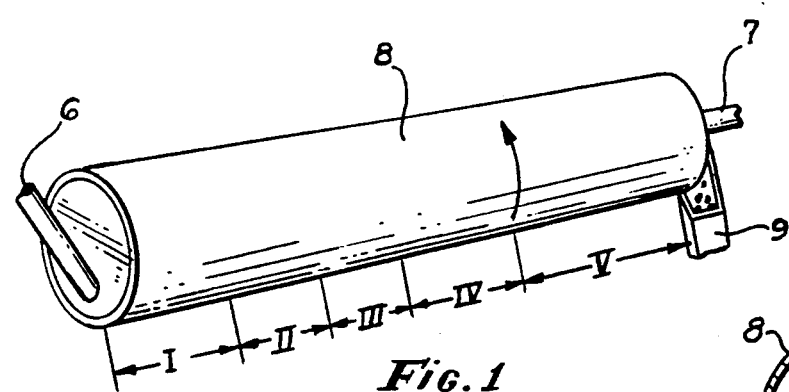
FIG. 1 is a perspective view of a complete wet-process rotary kiln. The various zones in which the transition from feed to product occur are indicated by Roman numerals.
Figure 2:
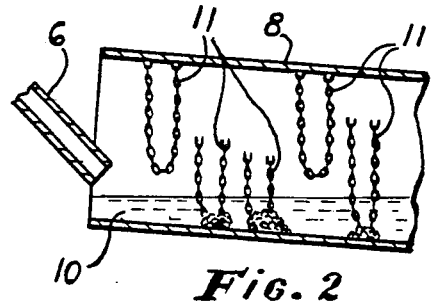
FIG. 2 is a cross-sectional elevation of Zone I showing the off-horizontal tilt of the kiln. Only representative chains are shown.
Figure 3:
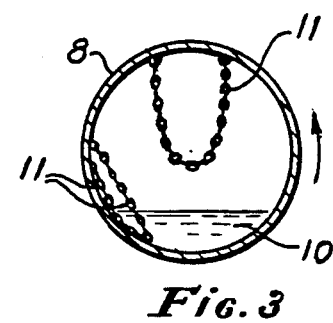
FIG. 3 is an end view corresponding to FIG. 2.

FIGS. 1-3 show the prior-art arrangement of kiln, slurry, and show partially the forest of chains which exists in many wet process rotary kilns. This showing of the setting to which my invention is a modification is deemed necessary for those unfamiliar with the present art to grasp the advantages added by my invention.

FIG. 1 depicts a conventional kiln for production of the main constituent in Portland cement (to which 4% gypsum $CaSO_4 \cdot \frac{1}{2} H_2O$ is added from other sources after the clinker from the kiln has been ground to powder). The kiln Item 8 is supplied with a wet slurry of ground raw material and water Item 10 through spout Item 6 and flows along the bottom surface of rotating kiln 8, which is tilted downward 3 or 4 percent. Zones along the length of kiln 8 produce differing effects on the flowing product, drying, preheating, calcining, and sintering, since the burner Item 7 produces a flow of combustion gases initially at 2600° F. or so in Zone V and exiting from Zone I at about 400° F. Chute 9 collects the product clinker. The area of interest which pertains to this invention is Zone I, in which the feedstock slurry still contains water, enough to flow downhill and the upper part of the kiln carries a reverse flow of combustion gases at roughly 400° F. with a substantial content of powder-sized product entrained. For completeness, it is noted that Zones III, IV and V are lined with firebrick, and only part of Zone I contains chains.

FIG. 2 shows spout 6, slurry 10, the wall of kiln 8 in section, and a number of chain loops 11, the purpose of which in conventional practice (and unchanged by my modification) is to absorb heat from the exhaust gases and supply it to the slurry 10. In the process of doing this, the wet chains also collect a portion of the entrained product. Piles of chain links exist beneath slurry level, being formed and pulled free as kiln 8 rotates. Chain loops, hanging on a helix rather than square or axial with respect to the kiln axis, do some stirring and scuffing on the kiln wall and slurry pool to inhibit coagulation of the slurry. (The kiln is usually shut down for maintenance only once a year). This motion of chain links means they can jam into any suitable size of crevice, a factor which my invention recognizes and avoids.

FIG. 3 merely shows that chain loops 11 have circumferential displacement of their ends as well as axial displacement as shown in FIG. 2. Again, it is to be noted that only representative chains are shown, in practice kiln 8, Zone I only, contains a large number of chain loops (elsewhere called a forest).

Figure 4:
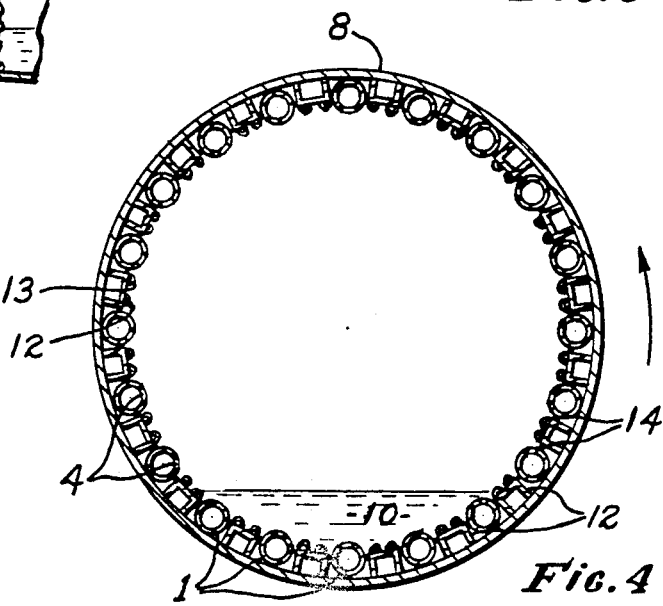
FIG. 4 is a cross-section of a kiln in which the invention has been installed in Zone I. Chains are omitted.

FIG. 4 is a cross section of kiln 8 as fitted with my invention. All around the inner periphery provision for chain mounting (chain hanger channels 12) alternates with pipe 1. Chains 11 are omitted entirely from FIG. 4 in the interest of clarity, although a pool of slurry 10 is shown. Two remarks are to be noted: the orientation of slurry-exit passage Item 4 relative to the radius of kiln 8 varies cyclically around the periphery, each slurry-exit passage 4 in pipe 1 differs from the adjacent one and is like the orientation in every other pipe 1 (i.e. alternate pipes). The second remark is that the size, location, and number of slurry-exit passages 4 may vary markedly from those illustrated or discussed; this matter is in the realm of detailed design independent of invention.

Figure 5:
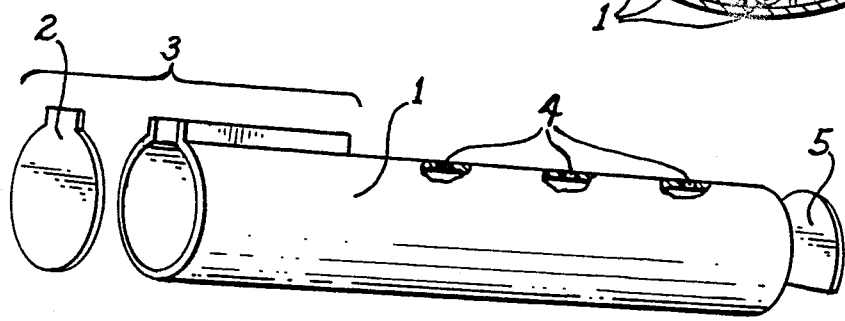
FIG. 5 is a perspective, exploded view of a typical pipe according to the preferred embodiment of the invention.

FIG. 5 shows the preferred embodiment of pipe 1 in exploded perspective, the three parts being welded together when pipe 1 is prepared ready for installation. Slurry-entrance scoop Item 3, by design and installation, allows slurry to fill pipe 1 at a rapid rate. During lifting of pipe 1 and tipping (tilting) of it (allowing the slurry to fall from the top half of the kiln back into the pool of slurry on the bottom) slurry-entrance scoop 1 emits a relatively small amount of slurry partly because it is slightly higher than slurry-exit passage 4 due to the 4 percent tilt of kiln 1.

Pipe partial-closure Item 5 provides a port to allow slurry to exit pipe 1 at its lower end, the size of the port being determined by design considerations. One such consideration is recognized: should replacement of pipe sections, rather than full-lengths, be desired in larger kilns, clearly the upstream sections could tolerate larger ports in pipe partial-closure 5 than the last section adjacent Zone II. To give an idea of scale, in a large kiln, the total length of pipe 1 might be 10 meters, and handling ease upon replacement of a section might dictate use of four 2½ meter long sections, in each of which the geometry of pipe partial-closure 5 could be different. The cross-sectional shape of pipes 1 is also arbitrary, although a circular cross section is preferred.

Figure 6:
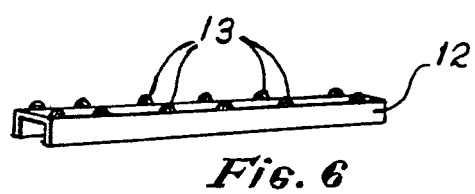
FIG. 6 is a perspective view of a channel according to the preferred embodiment of the invention.

FIG. 6 shows a perspective view of chain hanger channel 12, to which the pipes 1 are welded after the flanges of the channel are welded to the wall of kiln 8. A number of half-link pairs are permanently attached to the web of Item 12 so as to support the two ends of chain loop 11. In the preferred embodiment, the chain to half-link connection is made by conventional shackles. Other means of making this connection may be employed, subject only to avoidance of crevices large enough or of such a shape that links of nearly chains could become wedged tightly, rendering one chain loop inoperative. The fact that in both FIG. 4 and FIG. 6 the welded half-links 13 appear with openings, rather than being depicted as a side view, is of no significance with respect to my invention, since this detail of construction is immaterial to performance (the views can be considered options, or the half-links 13 considered to be mounted unsquarely in both views).

It is clear that modifications to the inventive concept and structure disclosed can be made by those skilled in the art without exercise of the inventive faculty. Therefore, the scope of this invention is defined by the scope of the following claim.

I claim:

1. In a rotating, horizontally elongated, sloping kiln through which pass high-temperature products of combustion in one direction and into the higher end of which wet slurry of the material being processed is continually introduced so as to cause its flow in the other direction, an improvement to reduce the escape of gas-borne, finely divided product out the higher end entrained in the flowing products of combustion, having as attachment provisions for chains a common structural steel channel having two straight parallel flanges integral with a web joining one edge of each flange, and a product chute, the improvement comprising:

a plurality of chain hanger channels fixed to the kiln inner circumference, and protruding inward, of a channel cross section with the web inward and spaced from each other, and extending horizontally from beyond the point where slurry is introduced through the horizontal portion of the kiln in which the slurry flows as a thick liquid, and serving as attachment provision for chains, and the same number of pipes having an arbitrary cross sectional shape, of a width to fit into the spaces between said adjacent chain hanger channels and a height at least that of the flange in said chain hanger channel, and fixed to said chain hanger channels, having the upstream and downstream ends partially blocked and an auxiliary opening to the interior of each said pipe at the upstream end, each said pipe having a plurality of slurry-exit passages at intervals along its length, said slurry-exit passages being oriented with respect to the radius of the kiln at a repetitive pattern of angles, and a multiplicity of chain loops, loops formed by a single chain the two ends of which are attached to two said chain hanger channels, the center of each said chain loop extending to 65-85 percent of the kiln diameter hanging in a plane oblique to the kiln axis, whereby said pipes, when rotation of the kiln immerses them in slurry, fill to an extent with trapped slurry, releasing it through said slurry-exit passages as said slurry-exit passages progress toward the bottom of the trapped pool of slurry as will occur at some rotational angle of the kiln, and as the existing slurry falls to the bottom of the kiln through said chain loops some of the gas-borne finely divided product will adhere to the cascading globs of slurry and be recycled through the kiln rather than escaping with the discharged products of combustion, exiting the kiln's lower end at the product chute.

2. In a rotating, horizontally elongated, sloping kiln through which pass high-temperature products of combustion in one direction and into the higher end of which wet slurry of the material being processed is continually introduced so as to cause its flow in the other direction, an improvement to reduce the escape of gas-borne, finely divided product out the higher end entrained in the flowing products of combustion, having as attachment provision for chains a common structural steel member having two straight parallel flanges integral with a web joining one edge of each flange, and a product chute, the improvement comprising:

a plurality of chain hanger channels fixed to the kiln inner circumference, and protruding inward, of a channel cross section with the web inward and spaced from each other, and extending horizontally from beyond the point where slurry is introduced through the horizontal portion of the kiln in which the slurry flows as a thick liquid, and serving as attachment provision for chains, and the same number of pipes having an arbitrary cross sectional shape, of a width to fit into the spaces between said chain hanger channels and a height at least that of the flange in said adjacent chain hanger channel, and fixed to said chain hanger channels, having the upstream and downstream ends partially blocked and an auxiliary opening to the interior of each said pipe at the upstream end, each said pipe having a plurality of slurry-exit passages at intervals along its length, said slurry-exit passages being oriented with respect to the radius of the kiln at a repetitive pattern of angles, and a multiplicity of chains one end of which is attached to said chain hanger channels, whereby said pipes, when rotation of the kiln immerses them in slurry, fill to an extent with trapped slurry, releasing it through said slurry-exit passages as said slurry-exit passages progress toward the bottom of the trapped pool of slurry as will occur at some rotational angle of the kiln, and as the existing slurry falls to the bottom of the kiln through said chains some of the gas-borne finely divided product will adhere to the cascading globs of slurry and be recycled through the kiln rather than escaping with the discharged products of combustion, exiting the kiln's lower end at the product chute.

* * * * *